United States Patent [19]

Pamadi et al.

[11] Patent Number: 4,867,397
[45] Date of Patent: Sep. 19, 1989

[54] VEHICLE AERODYNAMIC DRAG REDUCTION SYSTEM AND PROCESS

[75] Inventors: Bandu N. Pamadi, Hampton; Lawrence W. Taylor, Jr., Williamsburg, both of Va.

[73] Assignee: Vigyan Research Associates, Inc., Hampton, Va.

[21] Appl. No.: 120,487

[22] Filed: Nov. 13, 1987

[51] Int. Cl.$^4$ ............................................. B62D 25/08
[52] U.S. Cl. .................................. 296/180.1; 296/91; 296/180.2; 296/180.4
[58] Field of Search ............. 296/15, 91, 180.1, 180.2, 296/180.4; 105/1.1, 1.2, 1.3

[56] References Cited

U.S. PATENT DOCUMENTS

| | | | |
|---|---|---|---|
| 3,415,566 | 12/1968 | Kerrigan | 296/91 |
| 3,929,369 | 12/1975 | Blair | 296/15 |
| 3,934,922 | 1/1976 | MacCready, Jr. et al. | 296/15 |
| 4,113,299 | 9/1978 | Johnson et al. | 296/15 |
| 4,457,550 | 7/1984 | Gielow et al. | 296/15 |
| 4,629,241 | 12/1986 | Gruich | 296/15 |
| 4,682,808 | 7/1987 | Bilanin | 296/15 |

FOREIGN PATENT DOCUMENTS

| | | | |
|---|---|---|---|
| 2950730 | 10/1980 | France | 105/1.1 |
| 553942 | 1/1957 | Italy | 296/91 |
| 60-95370 | 6/1985 | Japan | 296/15 |

Primary Examiner—Andres Kashnikow
Assistant Examiner—Matthew C. Graham
Attorney, Agent, or Firm—Wallace J. Nelson

[57] ABSTRACT

An apparatus and process for reducing the aerodynamic drag on land transport vehicles are disclosed wherein a pair of vertical panels 34, 36 (FIG. 3) are disposed on the forward surface of a vehicle body 30 and facing the airstream encountered during vehicle movement. Panels 34, 36 (and similar panels as shown in FIGS. 4–6 and 9) are thin rigid flat plates and disposed in spaced relationship from each other and spaced from the vehicle sides. An additional thin panel 59 secured to and spanning the pair of vertical panels is employed in the embodiment illustrated in FIG. 5. Panel height and location, relative to the vehicle surface, influences the drag coefficient of the vehicle body. This drag reduction is accomplished due to the transition in the flow, consequent to the flow separation at the panels, leading to flow reattachment to the vehicle body surface near the front thereof, as illustrated in FIG. 8. This reduction of aerodynamic drag results in significant fuel cost savings and conservation of energy resources.

9 Claims, 5 Drawing Sheets

VEHICLE AERODYNAMIC DRAG REDUCTION SYSTEM AND PROCESS

ORIGIN OF THE INVENTION

This invention was made with United States Government support under Contract NAS1-17919 awarded by the National Aeronautics and Space Administration. Accordingly, the United States Government has certain rights in this invention.

FIELD OF THE INVENTION

This invention relates generally to the reduction of aerodynamic drag on bluff bodies, and relates particularly to a system and process for the reduction of aerodynamic drag on road transport vehicles.

BACKGROUND OF THE INVENTION

The aerodynamic drag on bluff road transport vehicle bodies consists mainly of pressure drag with skin friction and base drags forming insignificant parts of the total drag. The flow field of bluff bodies is usually characterized by a large wake and periodic vortex shedding. This is especially true of non-circular cylinders with sharp windward corners operating at low and moderate or subcritical Reynolds numbers. The Reynolds number associated with small and medium size road vehicles usually falls in the subcritical range (1.0 to $2.0 \times 10^6$). The drag force associated with such flow pattern is very high. The existence of such a flow pattern over the road transport vehicles can lead to substantial expenditure of energy to overcome its aerodynamic drag.

One of the most popular systems or methods presently and previously employed for reducing the aerodynamic drag of bluff vehicles is the rounding of sharp corners or streamlining of the body shapes of the vehicles.

The effectiveness of corner rounding techniques, may be evaluated by utilizing a simple two-dimensional square section The drag coefficient of such a square section at subcritical Reynolds numbers is close to 2.0. With progressive increase in corner radius and creating a streamline effect, the drag coefficient reduces and reaches the limiting value close to 1.0 corresponding to circular cylinders. Thus, the maximum drag reductions achievable by the corner rounding technique appears to be about fifty percent. This limitation, along with the costs and other impractical aspects of the required substantial geometrical modification to the basic road vehicle to achieve this result, emphasizes the need for new systems and/or processes for aerodynamic drag reduction.

BRIEF DESCRIPTION OF THE INVENTION

It is therefore an object of the present invention to provide a new and novel system for reducing the aerodynamic drag on vehicles operating at subcritical Reynolds numbers.

It is another object of the present invention to provide a novel process for reducing the aerodynamic drag on bluff bodies with direct application to vehicle bodies.

A further object of the present invention is the use of strategically placed panels or strakes on the windward or leading edge surface of bluff bodies and road vehicles to reduce the aerodynamic drag thereon.

Another object of the present invention is a system for improving the operating efficiency of bluff body vehicles by reducing the aerodynamic drag thereon.

Another object of the present invention is a system for conserving fuel of transport vehicles by reducing the aerodynamic drag thereon.

A further object of the present invention is a process for conserving the energy expended in the operation of transport vehicles.

Another object of the present invention is a system of reducing the aerodynamic drag on land transport vehicles without major geometrical modifications thereof.

According to the preferred embodiments of the present invention the foregoing and additional objects are attained by securing a pair of vertical panels on the forward surface of the vehicle body facing the wind. The panels are thin, rigid, flat plates and disposed in spaced relationship from each other and spaced from the vehicle sides. When the vehicle has more than one frontal surface, panels are disposed on all such surfaces to capture the negative pressures thereon. The panel height and location relative to the vehicle surface influence the drag coefficient of the vehicle body and a drag reduction of up to 81.5 percent has been obtained for a specific two-dimensional configuration. This is accomplished due to the generation of suction on the forward surface between the panels and side edges and transition in the flow consequent to flow separation at the panels leading to the flow reattachment to the body surface near the front thereof. The reattached flow adhers to the body surface essentially along the entire length thereof. One embodiment of the present invention provides an additional thin panel secured to and spanning the pair of vertically disposed panels. This additional panel is disposed parallel to and adjacent the top surface of the vehicle body.

BRIEF DESCRIPTION OF THE DRAWINGS

A more complete appreciation of the invention and many of the attendant advantages thereof will be readily apparent as the same becomes better understood with reference to the following detailed description when considered in connection with the accompanying drawings wherein.

DETAILED DESCRIPTION

Figure 1:
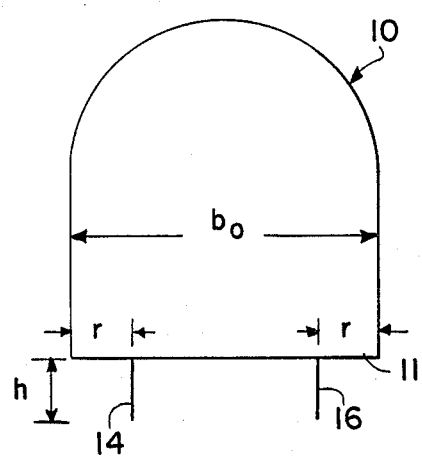
FIG. 1 is a top plan view of a model employed in wind and water tunnel tests to study the fluid flow patterns over a two-dimensional section on the present invention.

Referring now to the drawings, FIG. 1 shows a top view of a non-circular cylinder model and designated generally by reference numeral 10. Model 10 has a cross-section typical of the planform geometry of road vehicles. Model 10 is provided with a bluff front surface 11 and has a width designated as "$b_o$". A pair of spaced thin panels or strakes 14, 16 are perpendicularly disposed relative to the bluff front surface 11. Panels 14, 16 are of equal size and are provided with a height "h" and positioned a distance "r" from the respective front edge surfaces of model 10. As shown, panels 14, 16 are thin, flat surfaces and adapted to face into the air stream or fluid flow impinging on model 10. In the development of the present invention two-dimensional wind and water tunnel tests were conducted on various size and locations of panels 14, 16.

Figure 2:
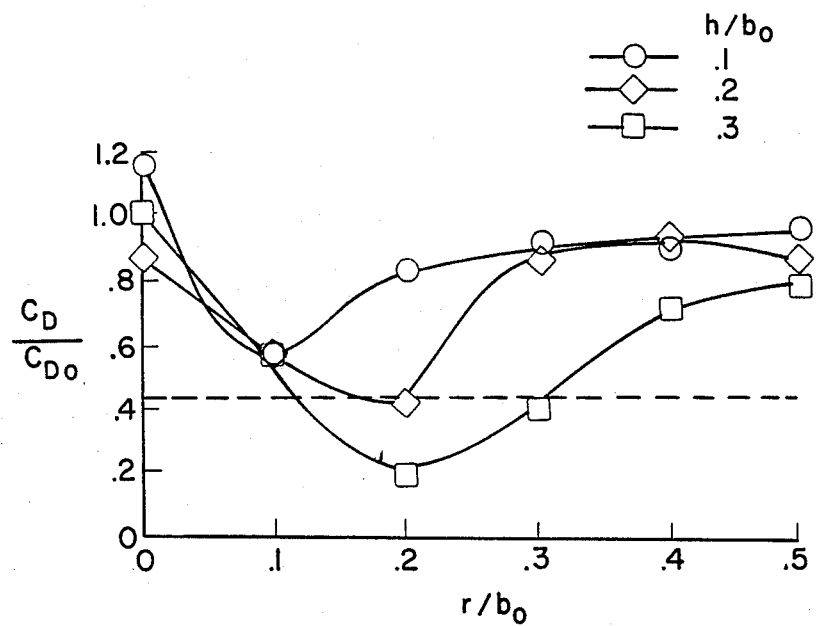
FIG. 2 is a graphical illustration of the present invention panel system at various locations on the model of FIG. 1 showing the effect of the invention on drag coefficient.

As shown in the graphical representation of FIG. 2, panels 14, 16 of various size ($h/b_o = 0.1$, 0.2, and 0.3) were employed in these tests and the location of the panels was varied systematically ($r/b_o = 0$ to 0.5). Detailed pressure measurements were performed in a two foot by two foot (61 cm × 61 cm) low speed open circuit wind tunnel having a maximum velocity of 115 ft/sec (35 m/s). Also, systematic water tunnel flow visualization tests wherein the Reynolds number was 6000, was carried out for various panel sizes to aid in the understanding and interpretation of the wind tunnel test data. The pressure test of the Reynolds number was in the range of 0.6 to $2.0 \times 10^6$ or subcritical. Measured surface pressures were integrated to obtain drag coefficients and the wind tunnel test results corrected for blockage effects. As shown in the graphical illustration, $C_{Do}$ and $C_D$ denote, respectively, the drag coefficients of the model section with and without panels 14, 16. Dotted line 21 indicates the existing limit obtainable by the corner rounding, drag reduction technique.

The basic model (without panels 14, 16 and not shown) was found to have a drag coefficient ($C_{Do}$) of 2.23 which was consistent with previous tests conducted for a similar shape as set forth in National Aeronautics and Space Administration publication NASA TN D-6615 (1972) entitled: "Effect of Reynolds Number and Body Corner Radius on Aerodynamic Characteristics of a Space Shuttle-Type Vehicle at Subsonic Mach Numbers" by L. H. Jorgensen and J. J. Brownson.

As noted, both the panel height and location have a strong influence on the drag coefficient $C_{Do}$. Generally the drag coefficient with panels is always less than that of the basic model without panels. Large reductions in drag coefficient occur when the panels are located at $r/b_o = 0.1$ to 0.2. The maximum reduction was obtained for a panel height $h/b_o = 0.3$ positioned at $r/b_o = 0.2$ and is considered the optimum panel configuration. In this configuration $C_D/C_{Do} = 0.185$ and corresponds to a drag reduction of 81.5 percent which obviously is a considerable improvement over the maximum 50 percent possible by the corner rounding technique.

The primary mechanisms leading to large drag reduction are identified as (1) confining the positive pressures only to a part of the frontal face between the panels and forcing the flow to separate at the edges of the panels so as to generate large suction pressures over the remaining part of the frontal face, and (2) smooth reattachment of the separated flow at the corners of the flat-faced body. In this fashion, the present invention results in a new apparatus and process for exploiting the flow separation for beneficial effects of drag reduction.

Figure 3:
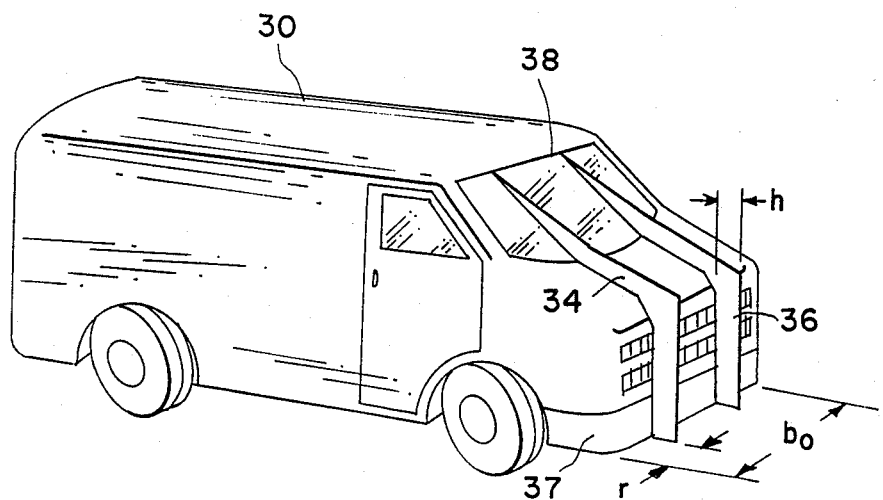
FIG. 3 is a view of the preferred embodiment of the invention on a specific land transport vehicle.

Referring now more particularly to FIG. 3, the preferred embodiment of the present invention is shown attached to a land based vehicle 30. As shown therein, a pair of thin panels or strakes 34, 36 are perpendicularly disposed relative to the vehicle body surface facing into the airstream during vehicle operation. For vehicle 30, there are three areas of this surface and the panels 34, 36 are contoured to be essentially perpendicular with each area and extend a length substantially equal to the height of the vehicle body. One end of each panel 34, 36 is positioned forward of and perpendicular to the vehicle bumper. The dimensions of the panels $h/b_o$ range from 0.1 to 0.3 and $r/b_o$ is 0.2 to 0.3.

This end of panel 34, 36 follows the contour of the grill area of vehicle 30 and is integral with the panel portion following the contour of the hood section of vehicle 30. The other end of panels 34, 36 are provided with a tapered height so as to terminate at a point substantially adjacent the top leading edge 38 of vehicle 30. This tapered portion of panels 34, 36 extends along the windshield area of vehicle 30 and is integral with the portions of panels 34, 36 that extend from and follow the contour of the hood section of vehicle 30. With the exception of the tapered portion of panels 34, 36, the remaining panel length is of a substantially uniform height. This is also true for the other embodiments described hereinafter.

Figure 4:
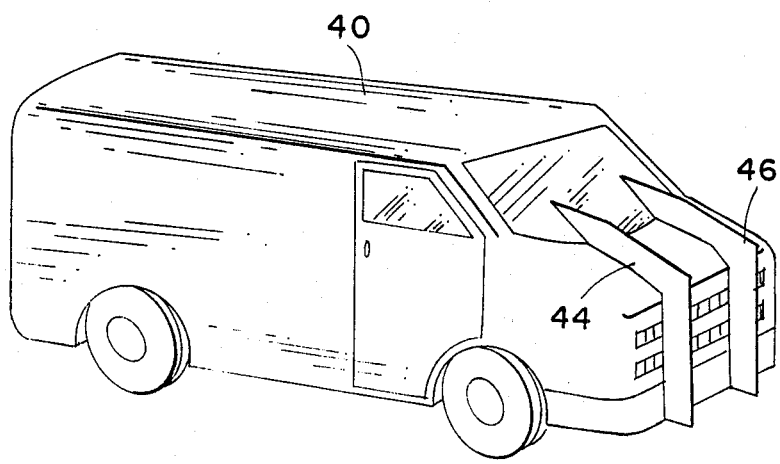
FIG. 4 is a view illustrating a modification of the invention embodiment shown in FIG. 3.

Referring now to FIG. 4, a slight modification of the embodiment shown in FIG. 3 is illustrated. In this embodiment, vehicle 40 is provided with a pair of spaced thin panels 44, 46 extending along the surface of vehicle 40 facing into the airstream. The tapered end of panels 44, 46 in this embodiment terminate at a point short of the top edge of the vehicle body 40 facing into the airstream or substantially at the mid-horizontal plane of the vehicle windshield.

Figure 5:
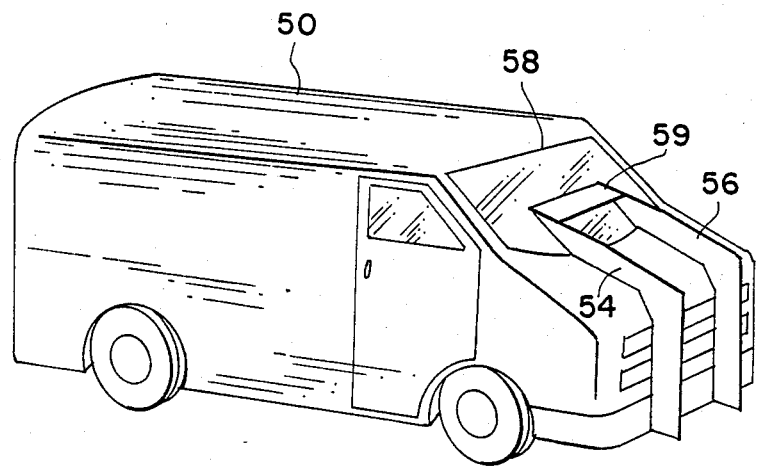
FIG. 5 is another view of the vehicle shown in FIG. 3 and illustrating another modification of the invention.

The embodiment shown in FIG. 5 for vehicle 50 is substantially identical to that of FIG. 4 with the exception that an additional thin panel member 59 is provided attached to the pair of thin panels 54, 56 adjacent the tapered point termini thereof. Panel member 59 is substantially parallel with and spaced from the top surface 58 of vehicle body 50. Additional panel member 59 assists in capturing the negative pressures on all three sides of the frontal surface of vehicle 50.

Figure 6:
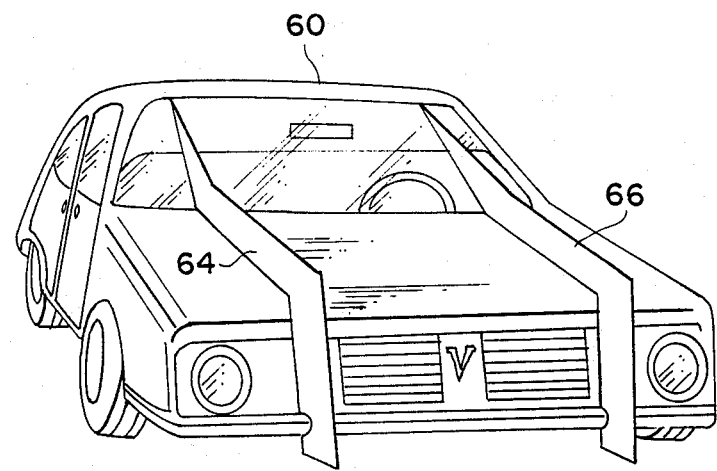
FIG. 6 is a view of a different type land transport vehicle employing the embodiment of the present invention shown in FIG. 3.

Referring now to FIG. 6, a different vehicle body 60 is illustrated with thin panel members 64, 66 being substantially identical to those employed in the embodiment of FIG. 3.

Figure 7:
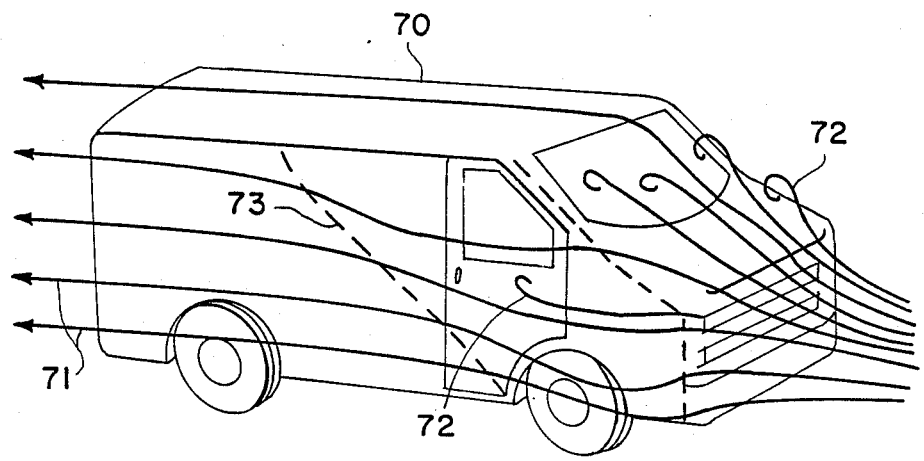
FIG. 7 is a schematic illustration of the air flow pattern experienced on the vehicle shown in FIGS. 3-5 without the panels of the present invention.
Figure 8:
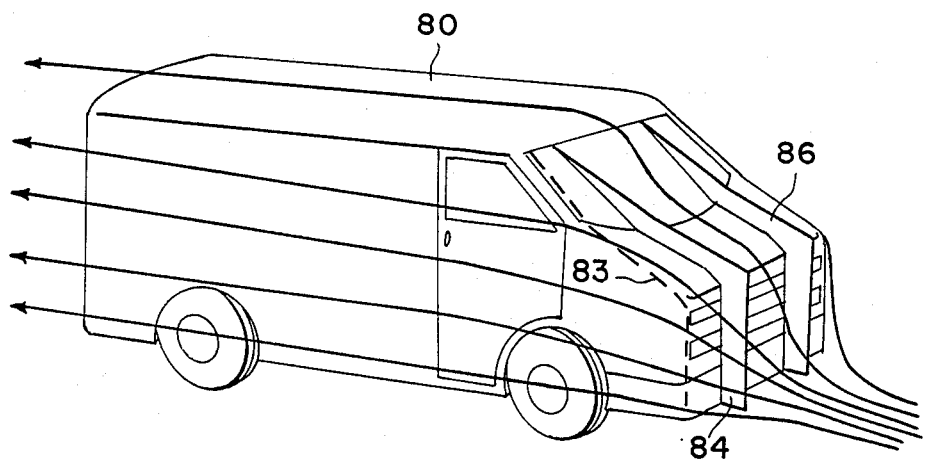
FIG. 8 is a view similar to FIG. 7 illustrating the air flow on the vehicle employing the present invention; and, FIG. 9 is a view of the preferred embodiment of the present invention on a different type vehicle.

Referring now to FIGS. 7 and 8 the flow patterns obtained on an exemplary land vehicle with and without use of the present invention is illustrated. In FIG. 7 the attached airflow about vehicle body 70 is represented by the arrow tipped lines, two of which are designated by reference numeral 71, extending aft of the vehicle body. The curve-tipped lines 72 represent turbulent flow and vortices generated by turbulence caused by the disruption of the airflow impinging on the front surface of vehicle 70 during vehicle movement. Dotted line 73 represents the area along vehicle body 70 where the disrupted or turbulent airflow reattaches to the body surface.

When employing the present invention, as schematically illustrated in FIG. 8 for vehicle 80, panel members 84, 86 serve to influence the airflow before it impinges against the body surface with small airflow vortices resulting along the length of the panels. This disrupted or turbulent airflow reattaches to vehicle body 80 along the area thereof represented by dotted line 83. This attached airflow about vehicle 80, along with the suction generated in the space formed by panels 84, 86 and the reattachment area represented by dotted line 83, reduces the aerodynamic drag on vehicle 80, it being known that attached airflow produces less aerodynamic drag than separated turbulent flow.

On the basic model (FIG. 7) the observed flow appears to separate around the corner of the front surface of the vehicle and reattaches downstream of the side window. On the roof the flow was found to be smooth and attached. With the installation of panels 84, 86 on vehicle 80, the reattachment occurs close to the corners and is maintained along the side windows to the end of the vehicle.

Figure 9:
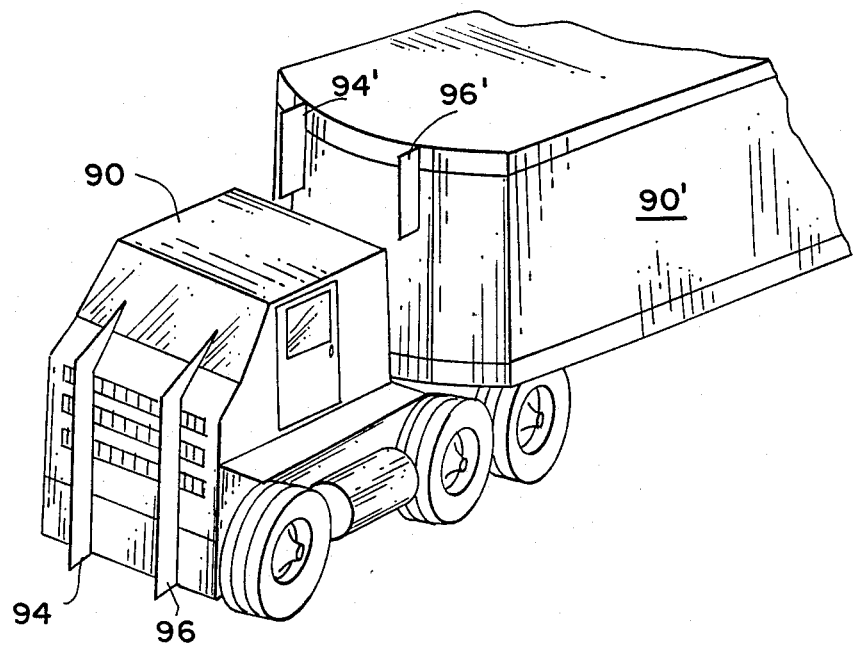

Referring now to FIG. 9, a tractor-trailer truck 90, 90' is illustrated employing the present invention. In this embodiment, separate thin panels or strakes 94, 96 and 94', and 96' are provided, respectively, for the tractor 90 and trailer 90'. Panels 94, 96 are disposed as described hereinbefore in reference to FIGS. 3-6 with each panel being substantially perpendicular to each area of the windward or leading edge surface of tractor vehicle 90. Trailer 90' is provided with separate drag reduction panels 94', 96' disposed on the forward surface thereof. Panels 94', 96' extend a length substantially equal to the height of trailer 90' and terminate in a tapered end to a point adjacent the top surface of trailer 90'.

It is thus seen that the panels of the present invention serve to produce a markedly streamlining effect over the vehicle body and substantial drag reduction appears clearly possible by use of the present invention. The present invention is far superior to prior art efforts discussed hereinbefore in that the present invention generates suction pressures on the frontal vehicle surface in addition to achieving smooth, attached, streamlined flow over the vehicle body. The novel apparatus and process of the present invention for reducing the aerodynamic drag of road transport vehicles is accomplished by employing vertical panels on the forward surface of the vehicle facing into the airstream. By considerably reducing the aerodynamic drag on these vehicles significant fuel cost saving and conservation of energy resources is accomplished when utilizing the present invention.

Road tests, covering normal recommended driving speeds, were carried out on the vehicle with panel configurations depicted in FIGS. 3-6 at normal driving speeds. In these tests, the vehicle deceleration was measured and analysis was performed to extract drag coefficient and fuel consumption. It was found that maximum drag reductions up to twenty-seven percent and corresponding fuel savings of eighteen percent were found for the vehicle-panel configurations depicted in FIGS. 3, 4, and 5. For vehicle 60 shown in FIG. 6, the reduction in drag coefficient was around five percent and savings in fuel was six percent.

Although the invention has been described relative to specific embodiments thereof and relative to specific vehicles, it is not so limited. The invention is considered applicable to any road vehicle including automobiles, trucks, buses and trains. Also, it is to be understood that various modifications and variations of the specific embodiments described herein will be readily apparent to those skilled in the art in the light of the above teachings without departing from the spirit or scope of the appended claims.

Thus, although the vertical panels have been described as being thin flat plates, they may also be formed of a tapered configuration with the area thereof attached to the vehicle being thicker than the free leading edge surfaces. Also, the panels can be readily incorporated into the vehicle body shape and configuration. Although no details have been described concerning attachment of the thin vertical panels to the vehicle surface, it is to be understood that any conventional attachment mechanism is considered applicable to the present invention. For example, suitable brackets may be secured to the vehicle leading edge surfaces and the panels bolted, riveted, or otherwise conventionally attached to these brackets.

In the embodiments having multiple leading edge surfaces, the vertical panels may be formed of a single length contoured to abut against and attach to the various surfaces of the vehicle or the panels may be formed in individual segments, one for each leading edge vehicle surface, and attached to each other as well as to the vehicle surfaces, as so desired. The segment of the vertical panels disposed against the windshield leading edge vehicle surface may be bonded directly to the windshield or secured to the panel segment abutting thereagainst on the vehicle.

In some instances, it may be desirable to have the vertical panels in inoperative position at times. In this event, the vertical panels may be removably attached to the vehicle or adapted to be folded flat against the vehicle surface. In this setting, the segment of the vertical panels disposed against the windshield area would be removably attached.

For more permanent attachments of the vertical panels to land vehicles, conventional deployment and retraction mechanisms may be utilized. Conventional electrical, pneumatic and hydraulic deployment and retraction mechanisms, such as used in automobile radio antennas, convertible tops and aircraft control surfaces could be utilized with the vertical panels of the present invention, if so desired.

No specific materials have been discussed for manufacturing the vertical panels of the present invention, it being understood that any lightweight metal, alloy, plastic or composite material capable of maintaining its rigidity under the operative conditions is considered useful in practice of the present invention. For obvious safety reasons, at least the segment(s) of the vertical panels employed adjacent the windshield area of the vehicle surface should be formed of essentially transparent or translucent material. Rigid polyvinylchloride meets this criteria and may be employed for the panels in the preferred embodiments described herein.

The foregoing and additional variations and modifications as described herein, may be employed to reduce the aerodynamic drag or road transport vehicles, according to the present invention. It is therefore to be understood that the invention may be practiced otherwise than as specifically described.

What is claimed as new and desired to be secured by Letters Patent of the United States is:

1. Apparatus for reducing the aerodynamic drag on a transport vehicle body comprising, in combination with the vehicle body:

a pair of thin panel members secured to and perpendicularly disposed relative to the surface of the vehicle body facing into the airstream, said pair of thin panel members extending a length along at least a major portion of the height of the vehicle body surface facing into the airstream, said pair of thin panel members being disposed in spaced relationship with one each being adjacent to and spaced from an edge of the transport vehicle body, said vehicle body having multiple contoured surfaces including at least one surface each for the grill, hood and windshield area of the vehicle body and wherein portions of said pair of thin panel members are disposed substantially perpendicular to each of said multiple contoured surfaces, and said pair of thin panel members being provided with a substantially uniform height over a major portion of the length thereof perpendicular to the vehicle grill and hood body portions and a tapered height along the length thereof disposed perpendicular to the vehicle windshield body portion.

2. The apparatus of claim 1 wherein at least the tapered portion of said pair of thin panel members disposed perpendicular to the vehicle windshield body portion is formed of a rigid transparent material.

3. Apparatus for reducing the aerodynamic drag on a transport vehicle body comprising, in combination with the vehicle body:

a pair of thin panel members secured to and perpendicularly disposed relative to the surface of the vehicle body facing into the airstream, said pair of thin panel members extending a length along at least a major portion of the height of the vehicle body surface facing into the airstream, said pair of thin panel members being disposed in spaced relationship with one each being adjacent to and spaced from an edge of the transport vehicle body, and said pair of thin panel members being provided with a substantially uniform height over a major portion of the length thereof and a tapered height along a minor portion of the length thereof.

4. The apparatus of claim 3 wherein the tapered height portion of said pair of thin panels tapers toward the top leading edge of the vehicle body surface facing into the airstream.

5. The apparatus of claim 3 wherein the tapered height portion of said pair of thin panels terminates at a point adjacent the top leading edge of the vehicle body facing into the airstream.

6. The apparatus of claim 3 wherein the tapered height portion of said pair of thin panels terminates at a point short of the top edge of the vehicle body facing into the airstream.

7. The apparatus of claim 6 including an additional thin panel member attached to said pair of thin panels adjacent the point termini thereof, said additional panel spanning the space between said pair of thin panels and said additional panel also being substantially parallel with and spaced from the top edge of the vehicle body surface facing into the airstream.

8. Apparatus for reducing the aerodynamic drag on a tractor-trailer transport vehicle comprising;

a first pair of thin panel members secured to and perpendicularly disposed relative to the surface of the tractor body facing into the airstream, said first pair of thin panel members extending a length along at least a major portion of the height of the tractor body facing into the airstream, said first pair of thin panel members being disposed in spaced relationship with one each being adjacent to an edge of the tractor body, a second pair of thin panel members secured to and perpendicularly disposed relative to the surface of the trailer body facing into the airstream, said second pair of thin panel members extending a length along at least the portion of the height of the trailer body exposed to the airstream above the tractor height, said second pair of thin panel members being disposed in spaced relationship with one each being adjacent an edge of the trailer body, said first and said second pair of thin panel members being provided with a substantially uniform height over a major portion of the length thereof and a tapered height along a minor portion of the length thereof with the tapered height portion of said first pair of thin panel members terminating at a point adjacent the top edge of the tractor body facing into the airstream and the tapered height portion of said second pair of thin panel members terminating at a point adjacent the top edge of the trailer body facing into the airstream.

9. The apparatus of claim 8 wherein at least a portion of said first pair of thin panel members is formed of a rigid transparent or translucent material.

* * * * *